United States Patent
Moore, Jr. et al.

(10) Patent No.: US 6,807,195 B1
(45) Date of Patent: Oct. 19, 2004

(54) SYNCHRONIZATION ARRANGEMENT FOR PACKET CABLE TELEPHONY MODEM

(75) Inventors: Richard Moore, Jr., Harleysville, PA (US); William H. Blum, Harleysville, PA (US); Edward Morgan, Gaithersburg, MD (US); Zoran M. Ladenovic, Bethesda, MD (US); Andrew Allen, Mundelein, IL (US); Michael Konopinski, Huntley, IL (US)

(73) Assignees: General Instrument Corp., Horsham, PA (US); Telogy Networks, Inc., Germantown, MD (US)

( * ) Notice: Subject to any disclaimer, the term of this patent is extended or adjusted under 35 U.S.C. 154(b) by 490 days.

(21) Appl. No.: 09/671,096

(22) Filed: Sep. 27, 2000

Related U.S. Application Data

(60) Provisional application No. 60/156,682, filed on Sep. 29, 1999.

(51) Int. Cl.[7] .................................................. H04J 3/06
(52) U.S. Cl. ........................ 370/503; 375/222; 375/356; 375/376
(58) Field of Search ................................. 370/480, 436, 370/486, 487, 489, 490, 503, 507, 517, 518; 375/371, 373, 375, 376, 222, 354, 355, 356, 359

(56) References Cited

U.S. PATENT DOCUMENTS

| | | | |
|---|---|---|---|
| 5,917,822 A | 6/1999 | Lyles et al. | |
| 6,041,051 A | 3/2000 | Doshi et al. | |
| 6,055,242 A | 4/2000 | Doshi et al. | |
| 6,075,787 A | 6/2000 | Bobeck et al. | |
| 6,075,972 A | 6/2000 | Laubach et al. | |
| 6,081,533 A | 6/2000 | Laubach et al. | |
| 6,282,204 B1 * | 8/2001 | Balatoni et al. | 370/421 |
| 6,449,291 B1 * | 9/2002 | Burns et al. | 370/516 |
| 6,611,537 B1 * | 8/2003 | Edens et al. | 370/503 |

OTHER PUBLICATIONS

Laubach, The UPSTREAM Protocol for HFC Networks Revision 2, COM21/3COM, pp. 1–130, 1996.*

* cited by examiner

*Primary Examiner*—Frank Duong

(57) ABSTRACT

The generation and upstream transmission of voice packets in an HFC network is controlled by including a synchronization circuit in the broadband terminal interface unit. The synchronization circuit is used to generate the timing signals for the codec, DSP and host microprocessor so that as the host microprocessor receives an upstream grant, the remaining components will assemble and forward the packets in synchronization with the grant.

8 Claims, 3 Drawing Sheets

US 6,807,195 B1

SYNCHRONIZATION ARRANGEMENT FOR PACKET CABLE TELEPHONY MODEM

CROSS-REFERENCE TO RELATED APPLICATION

This application claims the priority of Provisional Application Ser. No. 60/156/682, filed Sep. 29, 1999.

TECHNICAL FIELD

The present invention relates to an arrangement for providing upstream transmission of packet voice data through an HFC network and, more particularly, to the inclusion of a synchronization unit in a subscriber's broadband terminal interface unit to control the timing of the creation and transmission of upstream packets with respect to a received upstream grant.

BACKGROUND OF THE INVENTION

As originally designed and implemented, cable television systems used only coaxial cable between a head-end controller (or distribution station) and the customer. Newer cable systems tend to be hybrids of optical fibers and coaxial cable; optical fiber being used for the long-haul portion of the network and the coaxial cable being used to bring the communication from "curbside" into a home or office (in general, distances of less than a few thousand feet or so are spanned by a coaxial cable in such a network). FIG. 1 shows a hybrid fiber-coax (HFC) system 10 comprising a head-end controller 12 connected by one or more fiber optic links 14 to a fiber-to-coax conversion unit 16 which, in turn, feeds a coaxial cable distribution network 18 running into a number of individual user or customer sites (e.g., homes 20 in FIG. 1).

Cable systems originally provided unidirectional transfer of programming from head-end controller 12 to a home 20. With the growth of computer networks and a desire to provide real-time interactive services to the customer, the need has arisen for an efficient means to provide two-way (bi-directional) communication over an existing HFC network. A number of service providers currently furnish two-way services over cable. In these services, there is generally a modestly high bandwidth link from the head-end controller to the user site. However, the link in the other direction (i.e., an "upstream" link from the user's site to the network) is generally through conventional dial-up facilities such as a telephone modem or an integrated services digital network (ISDN) connection, which exhibits a much lower bandwidth that the downstream cable link. Such systems allow the customer to quickly download material from the network into their local machine (i.e., personal computer or any other type of terminal equipment), but does not readily permit the user to originate transmissions requiring high bandwidth (such as voice communications).

One way of enabling customers to originate voice communication is to permit them to use the cable system, which has a comparatively high bandwidth. Within existing HFC networks, providing customers with the ability to transmit data upstream requires service providers (i.e., those organizations that operate head-end equipment) to reserve sections of the cable spectrum (bandwidth) or time slots for the upstream communication. When used with voice communications however, long delays in the upstream packet transmission (as well as packet jitter) have a negative effect on the audible voice quality. In a traditional voice coding approach, the encoding of the PCM samples occurs at the end of the packetization period. The problem with the traditional approach is that it is difficult to synchronize the resultant encoded packets to the rest of the upstream communication system. In the prior art, the sample accumulation, encoding and packetization ran off of its own clock. Therefore, the "best" possible synchronization that could be guaranteed had a resolution of the packetization time.

Thus, a need remains in the prior art for an improved system of transmitting upstream packet voice traffic that minimizes the inherent packet characteristics (e.g., latency, jitter) that are particularly noticeable during voice communications.

SUMMARY OF THE INVENTION

The need remaining in the prior art is addressed by the present invention, which relates to an arrangement for improving the upstream transmission of packet voice data through an HFC network and, more particularly, to the inclusion of a synchronization unit in a subscriber's broadband terminal interface unit to control the timing of the creation and transmission of upstream voice packets with respect to a received upstream grant.

In accordance with the present invention, a programmable logic device (PLD) and phase-locked loop (PLL) are used to provide a number of different timing and interrupt signals for the remaining components in the BTI. The PLL uses timing information from the cable modem termination system (CMTS) to generate a base clock signal, which is then supplied to the PLD. The PLD, in turn, uses this clock to create a sampling clock signal that is supplied as an input to the codec used to create the PCM data packets of a to-be-transmitted voice signal. The PLD provides both an "interrupt" signal and a "frame sync" signal to the DSP, while simultaneously and in synchronization with the DSP interrupt signal, supplying a "host packet interrupt" signal to the host microprocessor. Therefore, upon the host microprocessor receiving an upstream grant (UG) signal, it will send an "open channel" command to the DSP, along with information regarding which frame within the packet interval to use to begin the transmission. Since the host microprocessor uses the UG signal to initiate the process and utilizes the same timing and interrupts as the DSP, the transmission of packets from the DSP to the host DSP interface will be controlled and synchronized with the UG signal.

These and other features and objects of the present invention will be more fully understood from the following detailed description of the preferred embodiments which should be read in light of the accompanying drawings.

BRIEF DESCRIPTION OF THE DRAWINGS

Referring now to the drawings.

DETAILED DESCRIPTION

Figure 1:
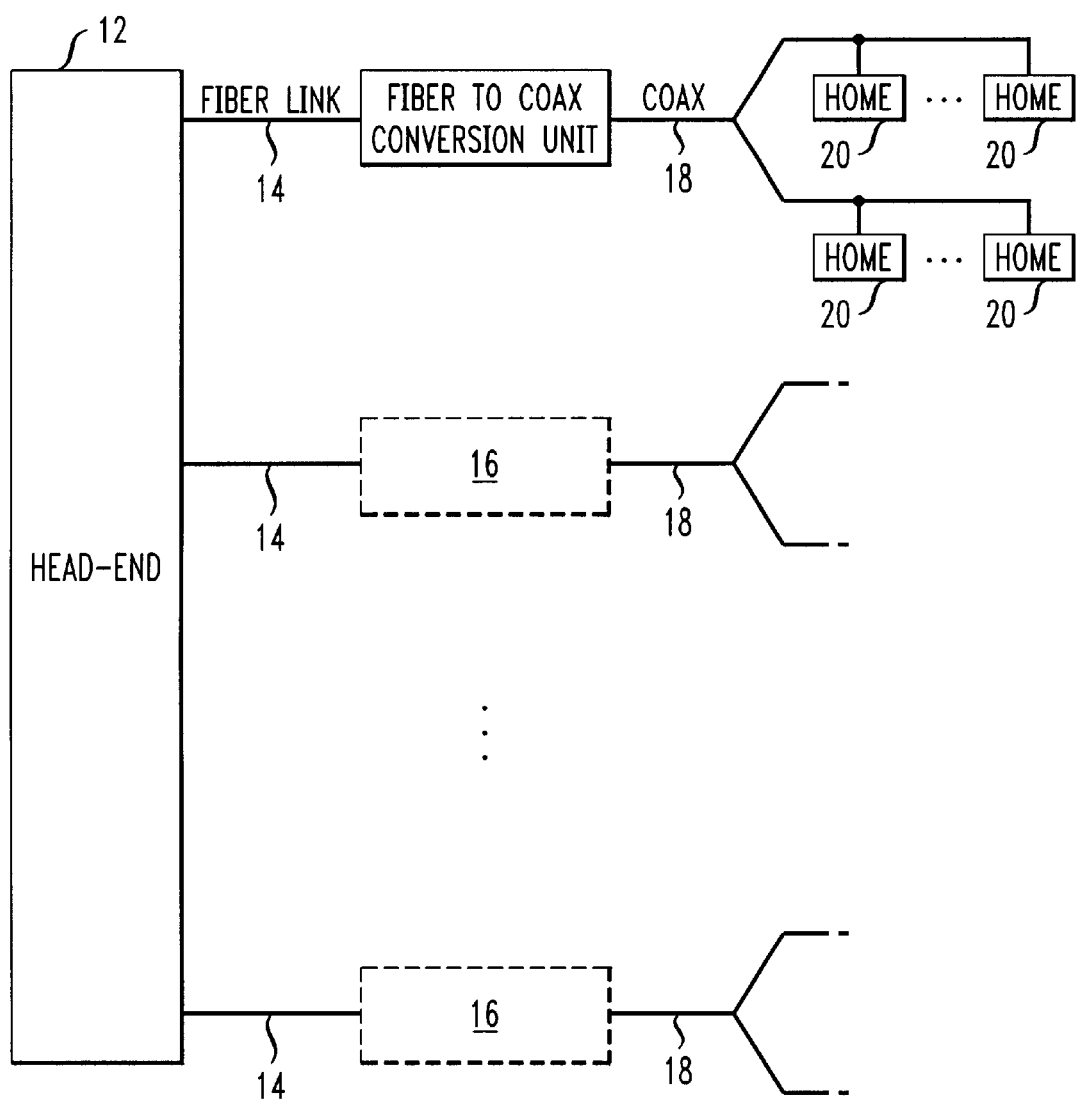
FIG. 1 illustrates a simplified HFC communication network.
Figure 2:
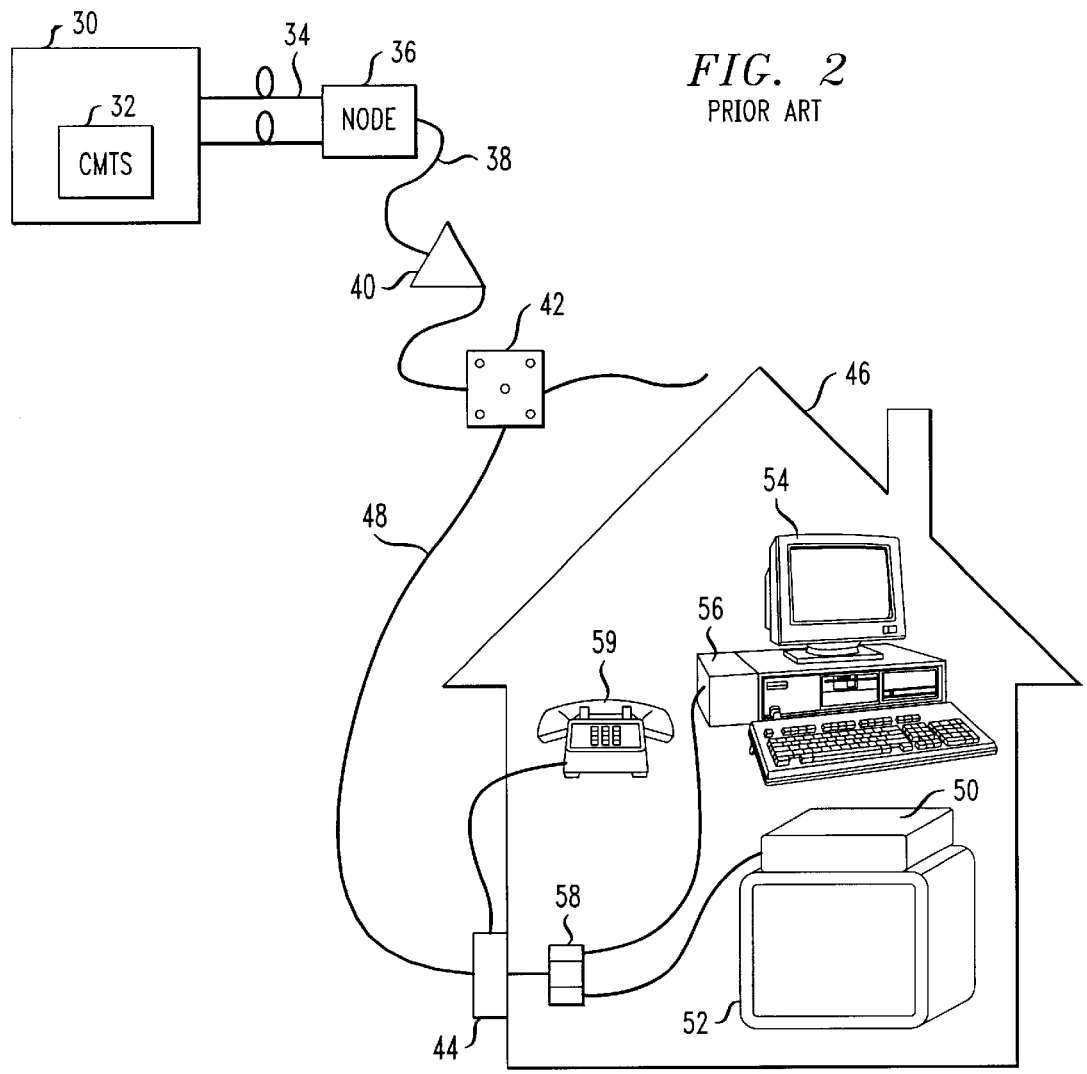
FIG. 2 illustrates various components of a prior art HFC network including broadband terminal interface (BTI) unit.

FIG. 2 illustrates a bi-directional cable system comprising a head-end 30, a network interface which is represented herein by a Cable Modem Termination System (CMTS) 32, where use of CMTS 32 to represent the network interface is not considered as a limitation on the incorporation of synchronization in the system of the present invention. Head-end 30 contains return path receiving equipment for receiving upstream communication along a fiber optic cable 34. In a preferred embodiment, separate cables are used for the transmission of optical signals to a node 36 and for the reception of optical signals from node 36. From node 36, downstream signals are transmitted over coaxial cable 38 through active amplifiers 40 and are intercepted by a tap 42. Tap 42 routes a portion of the signal to a broadband termination interface (BTI) 44 located at or near a residence 46. A drop cable 48 is used to connect tap 42 to BTI 44. In a preferred embodiment, drop cable 48 comprises a coaxial cable. When user herein, the phrase "broadband terminal interface" refers to a device for transmitting and receiving data, voice or video over an HFC network. Alternative terminology for a broadband terminal interface includes a "communications gateway" (CG) or "coaxial termination" (CT) unit. The term broadband terminal interface unit is not intended to be limiting and encompasses equipment which is located on the outside of the home, in the home in a centralized location such as attic, basement or equipment closet, or in another location in the homes. Businesses can also use broadband terminal interface units for the transmission and reception of data, voice or video signals.

As illustrated in FIG. 2, residence 46 can also contain a set-top box (STB) 50 which is typically connected to a television 52, as well as a computer 54 which can contain a cable modem 56. These units are typically connected through a splitter 58 to BTI 44. In accordance with the present invention, upstream communication from a telephone 59 can also be supported by BTI 44.

Figure 3:
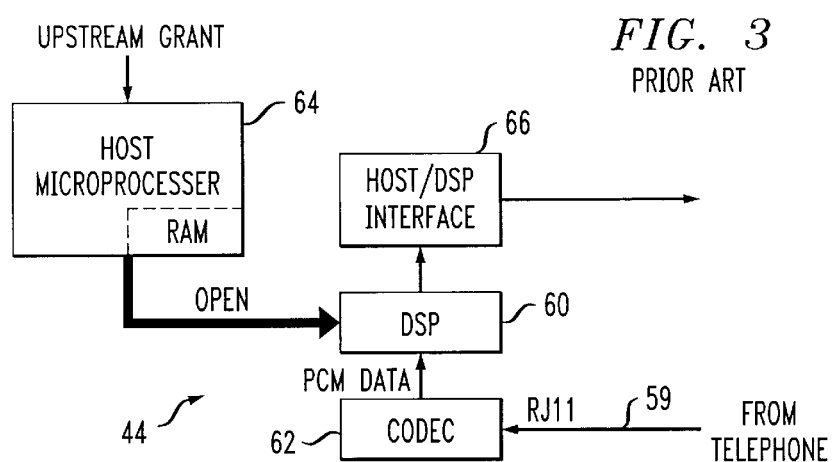
FIG. 3 is a diagram of various elements within a prior art BTI unit.

An exemplary broadband terminal interface (BTI) unit 44 of the prior art is shown in FIG. 3, where only the components relevant to the present invention are shown. In the particular arrangement illustrated in FIG. 3, a DSP 60 is used to process (among other things) a voice signal originating with a subscriber for upstream transmission over the coaxial portion of an HFC network. As shown, a codec 62 receives the incoming voice signal and digitizes the signal into a form acceptable for transmission. In most systems, a PCM (pulse code modulation) signal is used. The PCM output from codec 62 is then applied as an input to DSP 60 which assembles the PCM voice traffic into packets for upstream transmission. A host microprocessor 64 is included in BTI 44 and may contain a memory unit (e.g., RAM) for storing data relative to the operation of BTI 44 and various devices within the residence. The data may include, for example, the number of type of set-top boxes 50 connected to the BTI, as well as the number and type of cable modem connections 56 and conventional telephone connections 59. Upon receiving a command from host microprocessor 64 to begin transmitting data, DSP 60 will transfer the assembled packets to a host DSP interface 66 which then sends the packets out into the HFC network.

Currently, DSP 60 and host microprocessor 64 are not synchronized. In particular, DSP 60 will asynchronously start generating packets for host DSP interface 66 as soon as the PCM input is received from codec 62. Host microprocessor 64 uses an internal 5 ms timer to asynchronously poll host DSP interface 66 for the arrival of voice packets from DSP 60. In accordance with the current Data Over Cable System Interface Specification (DOCSIS) standard, the voice packets are transmitted across the HFC network using the Unsolicited Grant Service (UGS) by which the CMTS guarantees a periodic grant of upstream transmission bandwidth sufficient to transmit the voice grant. The generation and forwarding of the voice packets are currently asynchronous to the arrival of the grants for forwarding the voice packets into the network. Conventionally, the inter-packet duration can be 10 ms, 20 ms, or 30 ms, but is typically chosen to be 10 ms due to the critical need to minimize delay in the communication of voice traffic. However, the asynchronous timing of the various BTI components results in significant variations in latency within BTI 44 (as much as 15 ms of additional delay) on a per call basis, which can increase the overall BTI latency to 60 ms, a value unacceptable for voice traffic.

Additionally, since the clocking within codec 62, DSP 60 and host microprocessor 64 are all obtained from different sources, packets can be generated at a rate slightly faster than the host removes them, so packets can eventually be lost, with the delay changing as a function of time. In conventional systems, DSP 60 is polled at twice the packet rate, but even at this speed there can be missed upstream grants, causing the delay to increase over time.

Attempts at solving this latency problem include having host interface 66 interrupted by DSP 60 every time a packet is assembled and ready for transmission. With this approach the delay between host interface 66 and DSP 60 is minimized and the packets are transmitted as soon as they are ready. However, DSP 60 is capable of asynchronously generating a packet every 10 ms on each of its eight channels, resulting in a "mean interrupt period" of 1.25 ms. This interrupt period would be a significant overhead loading on interface 66. Further, it is not uncommon for a BTI to include a second DSP (to handle a second telephone line, for example). In this case, it is even more likely that the offsets between the DSP and host polling interval will be such as to generate a large latency for at least one of the DSPs, since the DSPs are not synchronized.

Another approach is to monitor the delay in the upstream queue and if it becomes too large, send a "timing adjustment" signal to the DSP, causing the DSP to drop the current frame from the packet and delay the packet generation by a period equal to the dropped frame. While this method provides a relatively simple technique for reducing queue latency without additional hardware, the frame-by-frame adjustments may not be sufficient. Certain codecs, additionally, cannot handle an "adjustable" packet (i.e., they cannot change their timing within the packet duration).

Figure 4:
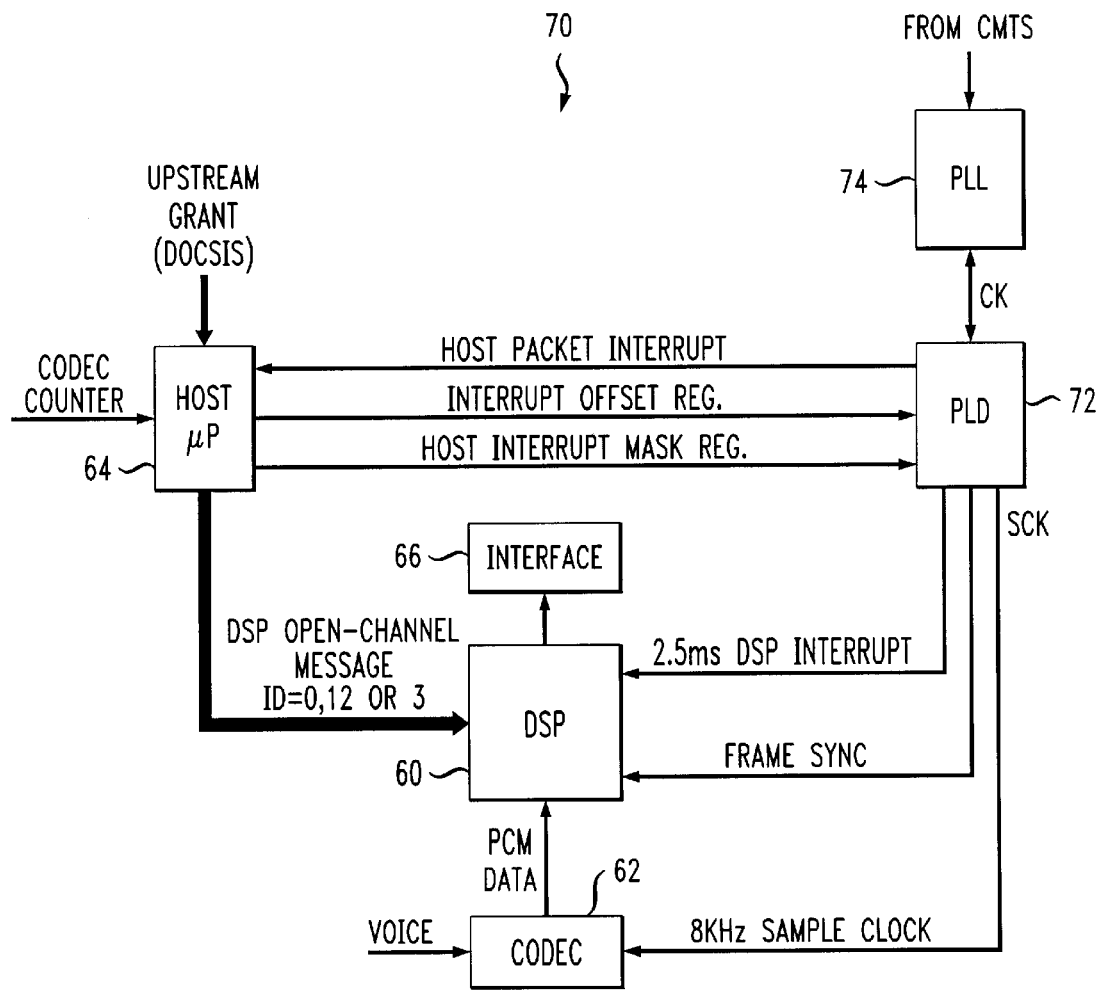
FIG. 4 illustrates a BTI of the present invention, including a synchronization circuit.

FIG. 4 illustrates an exemplary BI 70 of the present invention that addresses the above-described problems by including a synchronization arrangement to control the timing of the various components within the BTI. In the arrangement as shown in FIG. 4, a programmable logic device (PLD) 72 is used to implement the synchronization process. However, it is to be understood that any suitable custom or semi-customer integrated circuit capable of generating timing signals may also be used. As shown, a phase-locked loop (PLL) 74 is used to provide a basic clock signal CK to PLD 72, where the CK signal is derived from timing within the CMTS (not shown). PDL 72 derives an 8 kHz sampling clock signal SCK from CK and provides this as the sampling input to codec 62. PLD 72 also generates a framing sync pulse (FP) of a 2.5 ms period every 10 ms, which is applied as an input to DSP 60. DSP 60 uses FP to initiate the packetization process. In accordance with the present invention, FP is synchronized with the start of the first DSP interrupt. Framing pulse FP is used to DSP 60 and host microprocessor 64 as the common reference point for the start of a "nominal" packetization period. DSP 60 then increments an internal counter upon every 2.5 ms interrupt, resetting it to "zero" whenever the framing pulse is present. Thus, DSP 32 can be fined as having a framing ID of "0", "1", "2" or "3" for each 2.5 ms frame within the nominal 10 ms packetization period.

When DSP 60 receives an "open channel" command from host microprocessor 64, host microprocessor 64 will also pass to DSP 60 the particular framing ID that DSP 60 is to use to begin the packetization process. DSP 60 will then "wait" until that ID period (i.e., 0, 1, 2 or 3) within the nominal 10 ms frame before transmitting the first packet (where any previous 2.5 ms frames are dropped).

PLD 72 also supplies 2.5 ms "interrupts" to host microprocessor 64 (replacing the CPU timing interrupts discussed above in association with FIG. 3). A mask register is included in PLD 72 so that host microprocessor 64 can individually mask each one of the four 2.5 ms host interrupts within the nominal packetization period. A timing offset register is also included in PLD 72 which allows host microprocessor 64 to program the offset between DSP interrupts and host interrupts. In accordance with the present invention, therefore, host microprocessor 64 can set the packetization point of DSP 60 (using the ID), select one of its host interrupts and program the offset between the two so as to minimize the latency of a voice packet in host DSP interface 66.

In operation, when host microprocessor 64 receives a first "upstream grant" (UG) from the system it examines the codec clock counter to obtain the timing reference for the grant. Host microprocessor 64 then calculates the proper host DSP interrupt offset and selects the DSP interrupt and host interrupt to be used for the particular channel, based on pre-defined DSP timing delays for the selected codec (among other parameters all stored in its memory) in order to synchronize the DSP packetization and the interrupt used by host microprocessor 64 for forwarding the packet to the upstream grant. Additionally, host microprocessor 64 can ensure that any "jitter" between grants is taken into account so that a packet does not arrive late for the grant as a result of the grant being earlier than the first grant (in most cases, grant jitter is on the order of 1–2 ms).

Although this invention has been illustrated by reference to specific embodiments, it will be apparent to those skilled in the art that various changes and modifications may be made which clearly fall within the scope of the invention. Indeed, the present invention is intended to be limited only by the scope of the claims appended hereto.

What is claimed is:

1. A broadband terminal interface unit for use in a bi-directional HFC communication network, said broadband terminal intrface unit for supporting the upstream transmission of packetized digital communication and comprising a codec responsive to an analog input signal and generating as an output a coeded representation thereof;

a digital signal processor responsive to the coded output from said codec for assembling said coded output into packets comprising a predetermined number of frames;

a host microprocessor responsive to an upstream grant signal from said HFC communication network for transmitting an open channel command signal to said digital signal processor, said open channel command signal causing said digital signal processor to transmit assembled packets to a host DSP interface element for subsequent upstream transmission into said HFC communication network; and a synchronization circuit for providing timing pulses to said codec, digital signal processor and said host microprocessor to coordinate the generation and transmission of upstream packetized signals, the synchronization circuit comprising a phase-locked loop responsive to timing information from the HFC network to generate a base clock signal; and a programmable logic device responsive to the base clock signal.

2. A broadband terminal interface unit as defined in claim 1 wherein the codec generates pulse code modulated (PCM) signals.

3. A broadband terminal interface unit as defined in claim 1 wherein the digital signal processor is responsive to a framing synchronization pulses from the synchronization circuit to initiate the assembly of received coded information into packets.

4. A broadband terminal interface unit as defined in claim 1 wherein the digital signal processor forms a packet having a duration of 10 ms, the packet comprising four frames, each frame having a duration of 2.5 ms.

5. A broadband terminal interface unit as defined in claim 1 wherein the synchronization circuit transmits a frame synchronization pulse to the DSP to initiate each packet.

6. A broadband terminal interface unit as defined in claim 1 wherein the programmable logic device further derives a frame synchronization signal which is sent to the digital signal processor at the beginning of each packet assembly period.

7. A broadband terminal interface unit as defined in claim 1 wherein the programmable logic device derives a codec clock from the base clock signal supplied by the phase-locked loop.

8. A broadband terminal interface unit as defined in claim 7 wherein the codec clock signal exhibits a frequency of approximately 8 kHz.

* * * * *